(12) United States Patent
Piccionelli et al.

(10) Patent No.: US 7,792,297 B1
(45) Date of Patent: *Sep. 7, 2010

(54) SYSTEM AND PROCESS FOR LIMITING DISTRIBUTION OF INFORMATION ON A COMMUNICATION NETWORK BASED ON GEOGRAPHIC LOCATION

(76) Inventors: Greg A. Piccionelli, 1925 Century Park East, #2350, Los Angeles, CA (US) 90067; Ted R. Rittmaster, 2630 Grandoaks Dr., Westlake Village, CA (US) 91361

( * ) Notice: Subject to any disclaimer, the term of this patent is extended or adjusted under 35 U.S.C. 154(b) by 0 days.

This patent is subject to a terminal disclaimer.

(21) Appl. No.: 09/647,635

(22) PCT Filed: Mar. 30, 1999

(86) PCT No.: PCT/US99/06943
§ 371 (c)(1),
(2), (4) Date: Sep. 28, 2000

(87) PCT Pub. No.: WO99/51038
PCT Pub. Date: Oct. 7, 1999

(51) Int. Cl.
*H04K 1/00* (2006.01)
*G06F 13/00* (2006.01)

(52) U.S. Cl. .............................. 380/258; 726/4; 726/5; 705/51

(58) Field of Classification Search ................ 701/207; 380/258; 726/5, 28, 29
See application file for complete search history.

(56) References Cited

U.S. PATENT DOCUMENTS

| | | | |
|---|---|---|---|
| 4,860,352 A | | 8/1989 | Laurance et al. |
| 5,243,652 A | * | 9/1993 | Teare et al. ............... 380/250 |
| 5,400,403 A | * | 3/1995 | Fahn et al. ................. 705/51 |

(Continued)

FOREIGN PATENT DOCUMENTS

CN 1158456 A 9/1997

(Continued)

OTHER PUBLICATIONS

Supplementary European Search Report for EP 99 91 4289 (citing some of the references cited herein for related European patent application).

(Continued)

*Primary Examiner*—Jung Kim

(57) ABSTRACT

A communications system includes a plurality of recipient processors located at geographically remote locations with respect to each other and connected for communication with an information provider processor, over the communications network. The provider and recipient processors may comprise respective computers coupled for communication on the Internet or WWW. The provider processor is capable of providing information from any suitable source, by communicating such information over a communications network. However, access to the information by the recipient processors is controlled, based on the geographic location or region of the recipient processors. Each recipient processor is operably associated with a positioning system for providing geographic location information corresponding to the location or region in which the positioning system is located, such as a global positioning system GPS. The geographic position information is used to determine whether or not the processor requesting the information is within a restricted (or limited) or non-restricted region. This determination may be made comparing the geographic information provided by the recipient processor and positioning system with a list of non-restricted or non-limited (or a list of restricted or limited) geographic locations or regions.

12 Claims, 5 Drawing Sheets

U.S. PATENT DOCUMENTS

| | | | |
|---|---|---|---|
| 5,442,805 A | 8/1995 | Sagers et al. | |
| 5,519,403 A | 5/1996 | Bickley et al. | |
| 5,528,248 A | 6/1996 | Steiner et al. | |
| 5,555,376 A | 9/1996 | Theimer et al. | |
| 5,563,607 A | 10/1996 | Loomis et al. | |
| 5,568,153 A | 10/1996 | Beliveau | |
| 5,594,947 A | 1/1997 | Grube et al. | |
| 5,612,741 A | 3/1997 | Loben et al. | |
| 5,621,793 A * | 4/1997 | Bednarek et al. | 380/240 |
| 5,635,940 A | 6/1997 | Hickman et al. | |
| 5,669,061 A | 9/1997 | Schipper | |
| 5,678,194 A | 10/1997 | Grube et al. | |
| 5,682,525 A * | 10/1997 | Bouve et al. | 707/104.1 |
| 5,757,916 A * | 5/1998 | MacDoran et al. | 380/258 |
| 5,778,304 A | 7/1998 | Grube et al. | |
| RE35,916 E | 10/1998 | Dennison et al. | |
| 5,831,545 A | 11/1998 | Murray et al. | |
| 5,835,061 A | 11/1998 | Stewart | |
| 5,842,023 A | 11/1998 | Tsumura | |
| 5,852,775 A | 12/1998 | Hidary | |
| 5,857,155 A | 1/1999 | Hill et al. | |
| 5,889,953 A * | 3/1999 | Thebaut et al. | 709/221 |
| 5,898,830 A * | 4/1999 | Wesinger et al. | 713/201 |
| 5,910,799 A | 6/1999 | Carpenter et al. | |
| 5,922,073 A * | 7/1999 | Shimada | 713/200 |
| 5,926,116 A | 7/1999 | Kitano et al. | |
| 5,928,306 A | 7/1999 | France et al. | |
| 5,938,721 A | 8/1999 | Dussell et al. | |
| 5,943,424 A * | 8/1999 | Berger et al. | 705/64 |
| 5,946,687 A | 8/1999 | Gehani et al. | |
| 5,948,061 A * | 9/1999 | Merriman et al. | 709/219 |
| 5,959,577 A | 9/1999 | Fan et al. | |
| 5,969,678 A | 10/1999 | Stewart | |
| 5,987,381 A | 11/1999 | Oshizawa | |
| 6,009,116 A * | 12/1999 | Bednarek et al. | 375/130 |
| 6,014,090 A * | 1/2000 | Rosen et al. | 340/905 |
| 6,055,478 A | 4/2000 | Heron | |
| 6,067,582 A * | 5/2000 | Smith et al. | 710/5 |
| 6,085,098 A | 7/2000 | Moon et al. | |
| 6,115,754 A | 9/2000 | Landgren | |
| 6,133,853 A | 10/2000 | Obradovich | |
| 6,138,142 A * | 10/2000 | Linsk | 709/203 |
| 6,154,172 A * | 11/2000 | Piccionelli et al. | 342/357.1 |
| 6,208,866 B1 | 3/2001 | Rouhollahzadeh et al. | |
| 6,236,330 B1 | 5/2001 | Cohen | |
| 6,262,721 B1 * | 7/2001 | Tsukidate et al. | 715/721 |
| 6,282,362 B1 | 8/2001 | Murphy et al. | |
| 6,308,273 B1 * | 10/2001 | Goertzel et al. | 726/9 |
| 6,317,718 B1 | 11/2001 | Fano | |
| 6,389,288 B1 | 5/2002 | Kuwahara et al. | |
| 6,397,040 B1 | 5/2002 | Titmuss et al. | |
| 6,484,148 B1 | 11/2002 | Boyd | |
| 6,731,612 B1 * | 5/2004 | Koss | 370/310 |
| 6,985,588 B1 | 1/2006 | Glick | |
| 2002/0017977 A1 | 2/2002 | Wall | |
| 2004/0064305 A1 | 4/2004 | Sakai | |

FOREIGN PATENT DOCUMENTS

| | | |
|---|---|---|
| EP | 0 778 513 A | 6/1997 |
| JP | 04-320564 | 11/1992 |
| JP | 07328830 | 6/1997 |
| JP | 09-190236 | 7/1997 |
| JP | 08338034 | 9/1997 |
| JP | 08127557 | 12/1997 |
| JP | 08135589 | 12/1997 |
| JP | 04-118740 | 4/2004 |
| JP | 04-345235 | 12/2004 |
| WO | WO96/07110 | 3/1996 |
| WO | WO 96/07110 A | 3/1996 |
| WO | WO 97 13341 A | 4/1997 |
| WO | WO98/47295 | 10/1998 |
| WO | WO 98 47295 A1 | 10/1998 |
| WO | WO 99/51038 | 10/1999 |

OTHER PUBLICATIONS

Situated Information Spaces and Spatially Aware Palmtop Computers by George W. Fitxmaurice (Communications of the ACM, vol. 36, No. 7, pp. 39-49, Jul. 1993).

A Distributed Software Architecture For GPS-Driven Mobile Applications by Thomas G. Dennehy (1995 Mobile and Location-Independent Computing Symposium, pp. 99-108).

A Genetic Map Interface To Query Geographic Information Using The World Wide Web by David Crossley and Tony Boston (World Wide Web Journal, Fourth International World Wide Web Conference, pp. 723-735 (Dec. 11-14, 1995).

Mobisaic: An Information System For A Mobile Wireless Computing Environment by Geoffrey M. Voelker and Brian N. Bershad (Mobile Computing, pp. 375-395 (1996)).

Genesis And Advanced Traveler Information Systems by Shashi Shekhar and Duen-Ren Liu (Mobile Computing, pp. 699-723 (1996)).

Providing Location Information In a Ubiquitous Computing Environment by Mike Spreitzer and Marvin Theimer (Mobile Computing, pp. 397-423 (1996)).

Location-Based Authentication Grounding Cyberspace for Better Security by Dorothy E. Denning and Peter F. MacDoran (Computer Fraud & Security, pp. 12-16 (Feb. 1996)).

Maps alive: viewing geospatial information on the WWW by Michael Potmesil (Computer Networks and ISDN Systems, vol. 29, Nos. 8-13 (1997) pp. 1327-1342.

Mobile Information Service Based on Multi-Agent Architecture by Nobutsugu Fujino, Takashi Kimoto and Ichiro Ida (IEICE Trans. Commun., vol. E80-B, No. 10, Oct. 1997).

Chris Peat, "Welcome To Heavens above" Website, Nov. 28, 1999 and Sam Wormley Online Query regarding same, Jan. 3, 2000.

Denning et al. "Location-based authentication: grounding cyberspace for better security" Computer Fraud And Security, Oxford, GB, Feb. 1996.

"Heavens Above," http://web.archive.org/ web/19991128113302/ http://www.heavens-above.com/ (Sep. 14, 2004).

Office Action dated Oct. 1, 2009 from USPTO regarding related U.S. Appl. No. 09/812,296.

Office Action dated Apr. 2, 2009 from USPTO regarding related U.S. Appl. No. 09/812,296.

Office Action dated Dec. 15, 2005 from USPTO regarding related U.S. Appl. No. 09/812,296.

PCT International Search Report for related PCT/US99/06943 (WO 99/51038).

First examination report dated Jan. 24, 2005 from the European Patent Office regarding related European Patent Appln. No. 01924219.7.

Summons To Attend Oral Proceedings dated Sep. 25, 2006 from the European Patent Office regarding related European Patent Appln. No. 01924219.7.

Minutes of the oral proceeding dated Apr. 25, 2007 from the European Patent Office regarding related European Patent Appln. No. 01924219.7.

Decision to refuse dated Apr. 25, 2007 from the European Patent Office regarding related European Patent Appln. No. 01924219.7.

Response dated Jun. 23, 2005, to the first examination report regarding related European Patent Appln. No. 01924219.7.

Supplementary search report dated Oct. 25, 2002 from the European Patent Office regarding related European Patent Appln. No. 99914289.6.

Examination report dated May 19, 2004 from the European Patent Office regarding related European Patent Appln. No. 99914289.6.

Examination report dated Apr. 15, 2005 from the European Patent Office regarding related European Patent Appln. No. 99914289.6.

Examination report dated Feb. 13, 2008 from the European Patent Office regarding related European Patent Appln. No. 99914289.6.

Notice of intent to grant dated Sep. 17, 2008 from the European Patent Office regarding related European Patent Appln. No. 99914289.6.

Official Action dated Feb. 11, 2009, from the Mexican Patent Office regarding related Mex. Pat. Appln. No. PA/a/2005/00935 and English translation.

First Office Action dated Oct. 29, 2004, from the Chinese State Intellectual Property Office (SIPO) regarding related Chinese Pat. Appln. No. 99809988.0 and English translation.

Notification of Granting of Patent Right dated Jul. 1, 2005, from the Chinese State Intellectual Property Office (SIPO) regarding related Chinese Pat. Appln. No. 99809988.0.

Notice of Grounds of Rejection dated Aug. 4, 2009 from the Japanese Patent Office regarding related JP Pat. Appln. No. 541832/2000.

\* cited by examiner

SYSTEM AND PROCESS FOR LIMITING DISTRIBUTION OF INFORMATION ON A COMMUNICATION NETWORK BASED ON GEOGRAPHIC LOCATION

RELATED APPLICATIONS

The present disclosure is based on PCT application PCT/99/06943, having an international filing date of Mar. 30, 1999, and is a Continuation-in-part of U.S. patent application Ser. No. 09/052,746, filed Mar. 31, 1998 (now U.S. Pat. No. 6,154,172).

FIELD OF THE INVENTION

The present invention relates, generally, to a system, process and article of manufacture for limiting the distribution of information on a communications network based on geographic location and, in preferred embodiments, to such a system, process and article for limiting distribution of information on the Internet or World Wide Web, based on the geographic location of the Internet or Web user requesting the information, based on geographic location information generated by a satellite-signal positioning system.

BACKGROUND OF THE INVENTION

The Internet and World Wide Web (WWW) have opened vast new global marketplaces and opportunities for companies, organizations, institutions and individuals to distribute and obtain information and to interact verbally and visually with others, virtually on a world-wide basis. By employing the Internet and WWW, companies and groups of all sizes and individuals may have, in effect, a world-wide market in which to distribute information, products and services through the Internet or WWW (including, but not limited to, programs, movies, photographs, and other information that can be transmitted over the Internet or WWW).

However, such a geographically expansive marketplace can be problematic for providers of some products and services. Consider, for example, a company or individual involved in the business of selling a product or service, but which is constrained under statute or contract to a limited geographic sales region. In one representative example, a software company contracts with various software distribution companies to sell its software in specified sales regions, wherein each distributor is provided a sales region and, under the terms of the contract, is not allowed to sell the software outside of the region. A distribution company may desire to employ the Internet or WWW as a distribution channel, but would need to limit sales (and access to the distributed software) to only those Internet users (customers) that are located within the region assigned to that company.

As another example, consider a company or individual in the business of providing a lottery or other game in which a fee is required to play and the player is provided with a chance to win money or prizes. Under many legal jurisdictions (which can also be defined in terms of geographic areas), such lotteries and games may be illegal or otherwise limited by gambling statutes, rules or regulations. Again, the company or individual may desire to offer the lottery or game service over the Internet or WWW, but also avoid potential legal liability for offering such services to Internet users that are located in a geographic region of an adverse legal jurisdiction.

As yet another example, consider a company, organization or individual involved in distributing information having a content that is politically or ethically sensitive in certain geographic regions, but not other geographic regions. Again, the company, organization or individual may desire to provide the information over the Internet but, for political, ethical or legal reasons, may also desire to limit the accessibility to the information to certain geographic regions.

Thus, in a number of contexts, there is a need in the industry for a system by which a provider of a service or product on the Internet may readily limit access to the product or service, based on the geographic region in which the user requesting the product or service is located.

SUMMARY OF THE DISCLOSURE

Embodiments of the present invention relate to a system, process and article of manufacture for limiting the distribution of information on a communications network based on geographic location. In preferred embodiments, the invention relates to such a system, process and article for limiting distribution of information on the Internet and World Wide Web (WWW), based on the geographic location of the Internet user requesting the information.

A system according to a general embodiment of the present invention includes at least one information provider processor which is coupled to a plurality of recipient processors on a communications network. The recipient processors are located at geographically remote locations with respect to each other and connected for intercommunication with the provider processor, over the communications network. In preferred embodiments, the provider and recipient processors comprise respective computers coupled for communication on the Internet.

The provider processor is capable of providing information from any suitable source, by communicating such information over a communications network. However, access to the information by the recipient processors is controlled, based on the geographic location or region of the recipient processors.

Each recipient processor operates with an associated means for providing a position signal. Various embodiments of the invention may employ any suitable means which provides a computer readable signal that corresponds to the position, or geographic location, of the recipient processors, including, but not limited to, devices for generating pre-recorded geographic information and user-operated input devices. However, in preferred embodiments, the geographic location information is generated by a means which calculates the location from information received at the location from satellite signals, such as a global positioning system GPS.

The geographic position information is used to determine whether or not the processor requesting the information is within a restricted (or limited) or non-restricted region. This determination may be made by any suitable procedure, including, but not limited to, comparing the geographic information provided by the recipient processor and positioning system with a list of non-restricted or non-limited (or restricted) geographic locations or regions. Thus, according to some embodiments, information may be provided or not provided (access to the information may be allowed or denied) dependent on the geographic information provided by the recipient processor, such that, if a recipient processor provides geographic information corresponding to a restricted geographic location or region, then the provider processor will be controlled to not provide selective information to the recipient processor. On the other hand, if a recipient processor provides geographic information corresponding to a non-restricted geographic location or region, then the provider processor is controlled to provide the selective information to the recipient computer.

In further embodiments, a set of rules may be implemented, depending upon the geographic information (and, thus, the geographic location or region) such that various restrictions or limitations may be implemented for various geographic locations or regions. Thus, if a recipient processor provides geographic information corresponding to a first geographic location or region, then the provider processor may be controlled to not provide selective information to the recipient processor, unless further criteria is met. For example, such further criteria may include, but is not limited to, a minimum user age, a particular period of the day, week, month or year, or other suitable criteria. Other geographic locations or regions may be associated with similar or other limitations or restrictions to the access of information from the provider processor.

In this manner, the distribution of information on a communications network may be controlled, based on geographic location of the recipient of the information.

BRIEF DESCRIPTION OF THE DRAWINGS

A brief description of preferred embodiments of the invention will be made with reference to the accompanying drawings, wherein.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

As summarized above, the present invention relates, generally, to a system, process and article of manufacture for limiting the distribution of information on a communications network based on geographic location and, in preferred embodiments, to such a system, process and article for limiting distribution of information on the Internet or WWW, based on the geographic location of the Internet user requesting the information.

Figure 1:
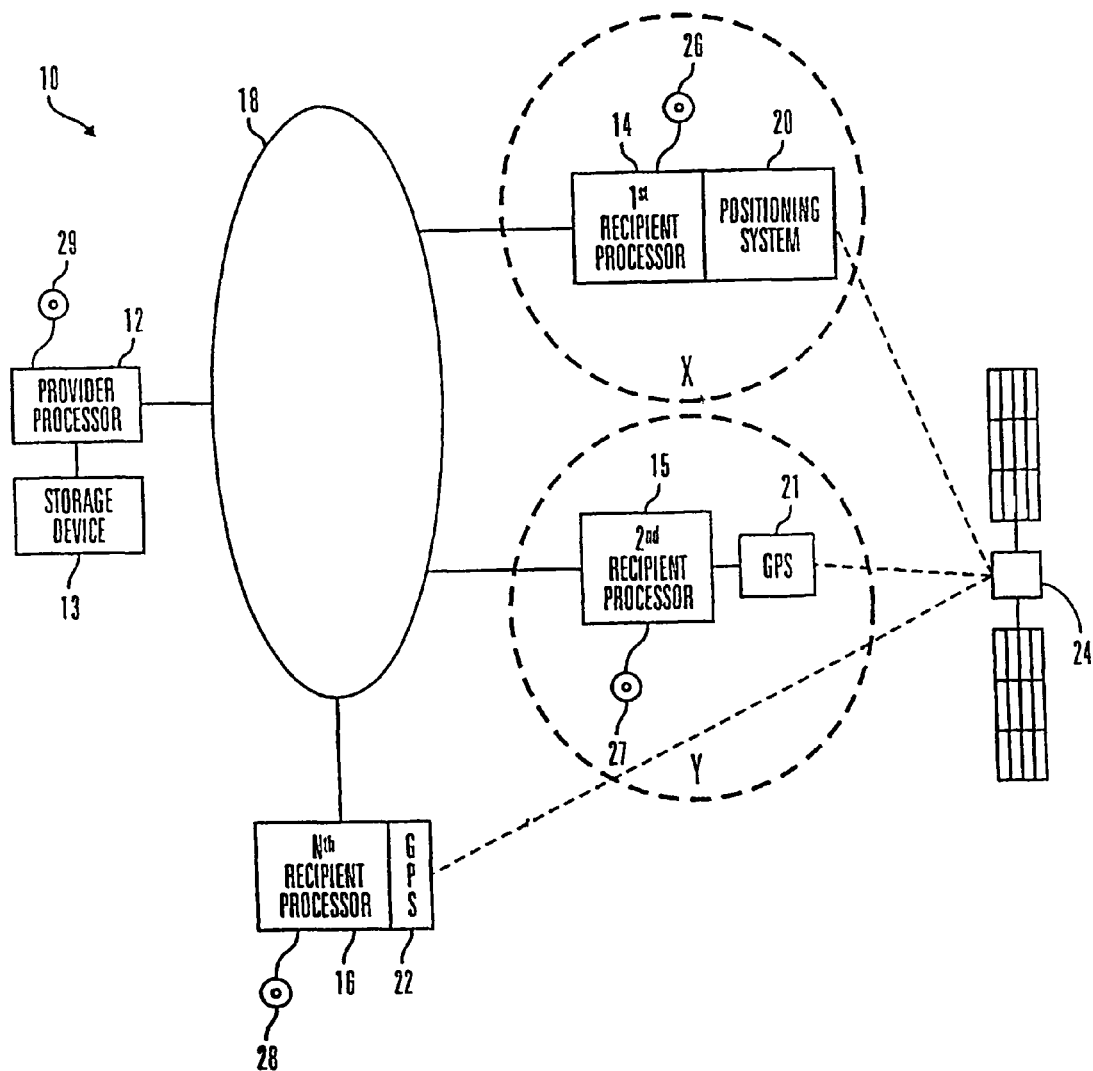
FIG. 1 is a generalized schematic view of a system according to an embodiment of the present invention.

FIG. 1 represents a general embodiment and can also represent a specific Internet embodiment of the present invention, as described below. With reference to FIG. 1, a system 10 is shown according to a general embodiment of the present invention, wherein an information providing processor (provider processor 12) is coupled for communication to a plurality of recipient processors 14-16 located at mutually different geographic locations with respect to each other, by a communications network 18. The processors may comprise any suitable data processing and communicating device controlled, preferably by a software program, to operate as described below. The communications network may comprise any suitable means which allows the recipient processors and the provider processor to communicate with each other, including, but not limited to, the Internet or WWW, intranet, cable or other hard-wired networks, optical, electromagnetic or other wireless networks, as well as hybrids thereof, or the like.

The provider processor 12 is capable of providing information from any suitable source (including, but not limited to an on-line source or a computer readable storage medium such as a hard or floppy disk, random access memory RAM, read only memory ROM, compact disk (CD), other optical storage disk, such as a DVD, or the like), by communicating such information over a communications network 18. Such information may include, but is not limited to, data, text or image information, for example, having different market, legal, political, social, ethical or moral implications in different geographic regions. However, access to the information by the recipient processors 14-16 is controlled, based on the geographic location or region of the recipient processors.

Each recipient processor 14-16 operates with an associated means 20-22 for providing a position signal. Various embodiments of the invention may employ any suitable means which provides a computer readable signal corresponding to the position, or geographic location or region, of the recipient processors, including, but not limited to, devices for generating pre-recorded geographic information, or user-operated input devices operated by a user to input information corresponding to a geographic location or region (for example, a keyboard, touch-screen, microphone, display icons that are selected by positioning a mouse cursor and clicking the mouse, or the like). However, in preferred embodiments, the geographic location information is generated by a means which calculates the location from information received at the location from satellite signals, such as a global positioning system GPS.

The geographic position information is used to determine whether or not the processor requesting the information is within a restricted (or limited) or non-restricted region. This determination may be made by any suitable procedure, including, but not limited to, comparing the geographic information provided by the recipient processor and positioning system with a list of non-restricted or non-limited (or restricted) geographic locations or regions. Thus, according to some embodiments, information may be provided or not provided (that is, access to the information may be allowed or denied) dependent on the geographic information provided by the recipient processor, such that, if a recipient processor provides geographic information corresponding to a restricted geographic location or region, then the provider processor will be controlled to not provide selective information to the recipient processor. On the other hand, if a recipient processor provides geographic information corresponding to a non-restricted geographic location or region, then the provider processor is controlled to provide the selective information to the recipient computer.

In further embodiments, a set of rules may be implemented, which depend upon the geographic information (and, thus, the geographic location or region, such that various restrictions or limitations may be implemented for various geographic locations or regions. Thus, if a recipient processor provides geographic information corresponding to a first geographic location or region, then the provider processor may be controlled to not provide selective information to the recipient processor, unless further requirements are met. Other geographic locations or regions may be associated with similar or other requirements, limitations or restrictions to the access of information from the provider processor.

While embodiments of the invention may be applicable in a variety of network contexts, in which a network of processors in mutually different geographic locations are coupled through a communications network to a provider processor, preferred embodiments relate to Internet or WWW contexts, in which a provider computer and a plurality of user computers are coupled for communication, through the Internet.

For example, FIG. 1 may be considered a generalized representation of an Internet or WWW embodiment, wherein the provider server 12 comprises an Internet product or service provider computer or server (hereinafter referred to as the provider server) coupled for communication, through the Internet 18, to a plurality of user computers. The plurality of user computers includes a first user computer 14 at a location within a first geographic region X and a second user computer 15 at a location within a second geographic region Y, remote from the first region X. Any suitable number of user computers at mutually different geographic locations and/or regions may be connected through the Internet 18, as represented by the Nth user computer 22. The user computers may be coupled in communication with the provider server 12 simultaneously or during mutually different periods of time. The user computers 14-16 and provider computer (or server) 12 may each comprise any suitable computer device having means for interfacing with and communicating on a communications network and for operating, preferably under the control of software programs, in the manner described below. Such computers and communication interfacing is well known in the art and is not described in further detail herein for purposes of simplifying the present disclosure.

Each user computer 14-16 is operatively coupled to an associated means 20-22 for providing a position signal to its associated user computer, indicative of the location or region in which the means is located. As discussed above, in some embodiments, such means may include a user input device associated with a given user computer 14-16 (including, but not limited to a keyboard, touch-screen, microphone, display icons that are selected by positioning a mouse cursor and clicking the mouse, or the like) which is operated by the user to input information associated with the user's location or region. For example, such information might include, but is not limited to, the user's zip code, street address, city, state, country, or the like. Alternatively, the means for providing position information may comprise a computer-readable storage media (including, but not limited to, a hard disk, floppy disk, optical or magneto-optical disk, or the like) on which position information is pre-stored and selectively retrieved by or provided to its associated user computer.

In a further alternative embodiment, the means for providing position information comprises a user input device, such as described above, for allowing a user to input a code (such as an alphanumeric string) that includes the user's geographic location in an encrypted (or otherwise hidden) format. For example, the provider of a product or service on the network (e.g., Internet) may issue authorized users such a code, based on the geographic location of the user. More preferably, the user will also be issued a user identification number specific to the user (such as, but not limited to, a number associated with the user's network address or the user's computer, such as a computer serial number or other number typically issued to and stored in computers by computer manufacturers), wherein the identification number and the geographic location information of the user may be encrypted together in a user code. The product or service provider may issue and communicate such a code to a user, for example, over the telephone, postal mail, electronic mail (e-mail), or the like, upon the user requesting such a code and further upon the provider verifying the user's geographic location. Verification of geographic location may be accomplished by any suitable process, including, but not limited to looking up the user's mailing address, or requiring the user to submit evidence.

In such an embodiment, the means for providing position information communicates the code (user location information encrypted code or a combined user id and user location encrypted code) to the provider server. The provider server includes further means (for example, a suitable program for controlling the server processor) for decrypting the encrypted code and deriving the user id and/or user location information therefrom. The provider server further includes means (for example, a suitable program for controlling the server processor) for comparing the decrypted information with, for example, entries in a table of authorized users and/or geographic locations therefor, stored in a persistent memory associated (or accessible) by the provider server. If the decrypted information does not match an entry for an authorized user (for example, an authorized user's id code, network address or computer information) and/or does not match the entry in the table for that user's verified geographic location, then the provider server will be controlled (by the software program) to deny access to the product or service. On the other hand, if the decrypted information does match an entry for an authorized user and its associated geographic location, then the user will be allowed access to the product or service.

However, in preferred embodiments, the means 20-22 associated with each user computer 14-16, for providing position information to its associated user computer, comprises a means which is capable of generating position information from signals and/or information obtained by the means in its location environment, including, but not limited to satellite signals received in its location environment. In preferred embodiments, each position information providing means comprises a satellite-signal positioning system, for example, a Global Positioning System GPS 20-22. More specifically, each positioning system 20-22 includes a receiver which receives satellite signals from one or more satellites 24 in orbit about the Earth and processes information derived from those signals to produce further information regarding the geographic location of the positioning system.

Therefore, the positioning system 20 produces information regarding its geographic location. Similarly, the positioning system 22 produces information regarding its geographic location, which is different than that of positioning system 20. In accordance with modern GPS technology, such geographic information may, for example, correspond to a pre-established global coordinate system such as, but not limited to, Latitude and Longitude (Lat/Long), Universal Transverse Mercator (UTM), Ordinance Survey of Great Britain (OSGB), Universal Polar Stereographic (UPS), Thomas Brother's Page and Grid™, Trimble Atlas™, or the like.

In preferred embodiments, the positioning systems 20-22 are coupled in close proximity to their respective associated computer 14-16 (or at least to a video monitor coupled to the associated computer), such that each positioning system and its respective associated computer (or computer monitor) are located in the same geographic region. Thus, in FIG. 1, the positioning system 20 is at a location within the same geographic region X as computer 14. Similarly, the positioning system 21 is at a location within the same geographic region Y as computer 15.

In preferred embodiments, the positioning systems are internal positioning systems, in that they are incorporated within the same housing that also contains their respective associated computer, as shown with respect to positioning system 20 and computer 14. In other preferred embodiments, the positioning systems are located in a housing external to the associated computer's housing, but still within the proximity of the associated computer's housing (or monitor), as shown with respect to positioning system 21 and computer 15. Further preferred embodiments may employ one or more computers with internal positioning systems and one or more computers with external positioning systems, as shown in FIG. 1. Because of the close proximity of each positioning system to its associated computer (or computer monitor), a given positioning system will produce location information that corresponds to the geographic location of its associated computer (or computer monitor), or at least to a geographic location within the same geographic region as its associated computer (or computer monitor).

As described above, the location information produced by each positioning system 20-22 is provided to the computer 14-16 respectively associated with the positioning system that produced the information. Interface hardware and software for coupling positioning systems, such as GPSs, with computers are well known in the art. Moreover, some portable computers are presently being manufactured with internal GPS hardware and software for processing geographic position information relating to the geographic position of the portable computer. Accordingly, technology associated with interfacing a positioning system and a computer for communicating information therebetween and processing, by the computer, of geographic location information is well known in the art and, for purposes of simplifying the present disclosure, is not described in detail herein.

In the FIG. 1 embodiment, the computers 14-16 are operated under the control of associated user software 26-28, respectively to communicate geographic information to the provides computer, such as a provider server 12. The server is operated under the control of associated server software 29 to selectively provide or deny a given computer 14-16 access to a product or service dependent upon the geographic information provided by the given computer. One embodiment of such an operational process is generally shown with respect to the flow chart of FIG. 2. At step 30 in FIG. 2, a user of, for example, the first user computer 14, sends a request over the Internet 18 to the server 12, requesting one or more products or services that can be provided over the Internet connection. Example embodiments of such a request are described in further detail below, with respect to FIGS. 3a and 3b.

In addition, geographic information corresponding to the geographic location and/or region X of the positioning system 20 (and, thus, of the first user computer 14) is communicated from the first computer to the server 12. Such geographic information may include, for example, data corresponding to coordinate values provided by the positioning system. Alternatively, such geographic information may include data corresponding to the region X, for example, determined by a routine of software 26, from information provided by the positioning system 20. Thus, for example, a software routine may control the computer 14 to determine a region X for example, the region within a particular zip code, city, state, country or other geographically defined region) in which the computer 14 is located from the location information provided by the positioning system 20 and to communicate identification data corresponding to that region (such as an identification name or code preassigned for region X).

Figure 2:
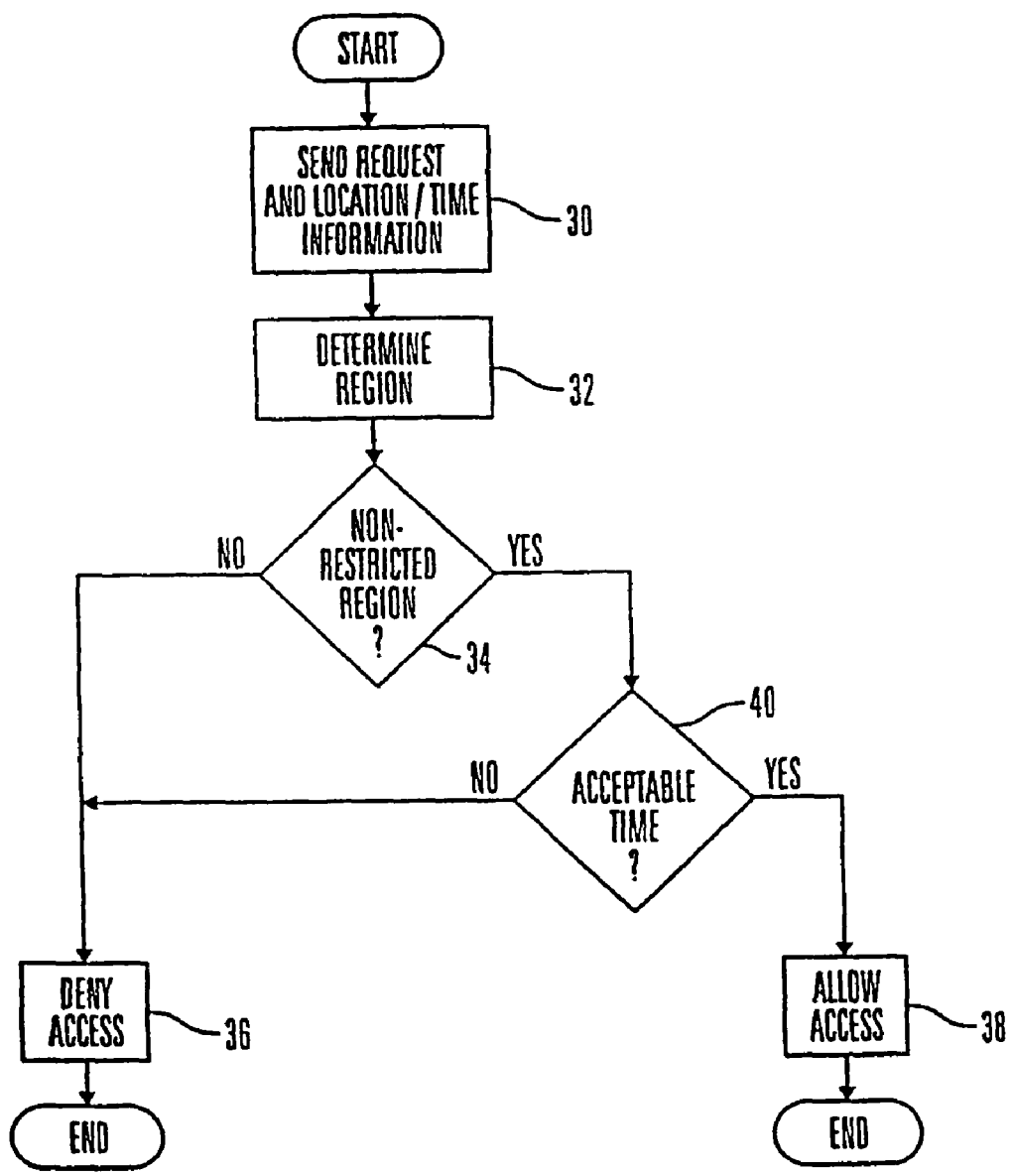
FIG. 2 is a flow chart representing a process carried out by the system of FIG. 1, according to an embodiment of the present invention.

In preferred embodiments, however, the determination of the region in which the user computer is located is performed at the provider server, under control of a routine of software 29 (as represented by step 32 in FIG. 2). Once the user computer's region (region X) is determined, a routine of software 29 controls the provider server 29 to determine whether or not the region X is a restricted region (step 34). This determination may be made by any suitable routine, including, but not limited to, a comparison of the data (e.g., ID data) for region X with a pre-stored (or on-line) table or list of restricted regions (or a list of non-restricted regions).

Alternatively, the determination of whether or not the user computer is in a restricted region may be made (at the user computer 14 or, more preferably, at the provider server 12) from data corresponding to the location information (such as coordinate values) provided by the positioning system 20, without determining the pre-assigned ID name or code for the region X. For example, data corresponding to coordinate values (as opposed to the ID name or code) may be applied in an algorithm or comparison routine to determine whether or not the coordinates are within a restricted region. Thus, in one example embodiment, a routine may determine, by a pre-stored (or on-line) mathematical comparison routine or algorithm, whether or not the coordinate value data is within a particular range corresponding to the range of coordinates of a restricted (or non-restricted) geographic region.

The path marked "No" from the step 34 in FIG. 2 represents a determination that the region X in which the user computer 14 is located is a restricted region. If the region X is determined to be a restricted region, then the provider server 12 is controlled to deny access by the user computer 14 to the requested product or service (step 36). In preferred embodiments, the server 12 provides a deny message to the user computer 14 as part of step 36.

On the other hand, if the region X is determined in step 34 to be within a non-restricted region, then the user computer 14 may be provided access to the product or service (step 38). In preferred embodiments, if access is allowed (in step 38), the server 12 downloads to the user computer 14, software files, programs, data, decode keys, or other information that defines the requested product or service or that are necessary for the user to obtain the requested product or service.

Accordingly, in the system embodiment of FIGS. 1 and 2, a user computer may communicate a request for a product or service, as well as geographic information identifying the location or region of the user computer, to a provider of the product or service on a wide area computer network, such as the Internet or WWW. The provider employs the geographic information to determine whether to allow or deny access to the product or service requested by the user computer. In this manner, the provider of a requested product or service on the network may control access to the product or service on the basis of the geographic location of the user making the request.

In further preferred embodiments, instead of a simple access/deny-access determination, the provider may provide limited access for one or more geographic regions or may provide various degrees of limited access, depending upon the geographic region of the user computer. Thus, for example, a set of rules may be implemented such that the server 12 in FIG. 1 may be controlled to allow full access to a particular product or service for user computers (such as 14)

in a first region (region X), partial access to the product or service for user computers (such as 15) in a second region (region Y) and no access for user computers (such as 16) located outside of regions X and Y. A set of rules may be pre-stored (for example, as part of the program controlling the determination step 34 or as part of another program or file operable with the control program), for implementing various combinations and degrees of limitations, depending upon the geographic location of the requesting user computer. Alternatively, a set of rules may be provided to the server 12 from an on-line source, or the like.

In some embodiments, according to such rules, the provider may require additional user input or other information to provide limited or full access, depending upon the geographic location of the user computer. For example, with respect to the above embodiment, the provider server 12 may be controlled to allow access to any user computer in the second region (region Y), only if the user also provides further information, such as the user's age, identification information, payment information, acceptance of an agreement, or other information, or only after the user is provided with a warning, disclaimer or other message or information. Preferably, the provider server 12 is controlled by the software 29 to communicate a request for such further information and/or to communicate the warning, disclaimer or other message or information to the user. Other information, which is not necessarily received from the user computer, may be employed in the determination of whether or not to allow access (full or limited). For example, restrictions or limitations may be imposed on certain regions during certain times of the day or during certain dates, wherein time or date information is provided to the server 12 from any suitable source.

One factor which affects the reliability and integrity of the above-described embodiments is the reliability and integrity of the positioning system (20-22) which receives the satellite signals and provides the location information used by the computer (14-16) for requesting the product or service. In preferred embodiments, reliability may be enhanced by communicating time information from the requesting computer to the server, where the time information corresponds to the time that the positioning system (20-22) associated with the requesting computer received the satellite signals. In other embodiments, the time information may correspond to the time that the positioning system generated the location information or provided the location information to the requesting computer for use in connection with the request. The server 12 may be controlled to make a determination (step 36 in FIG. 2) of whether or not the time information received from the requesting computer (14-16) is within an expected range, for example, within a preselected time period before the time that the server 12 receives the request (and/or the location information), which can be represented as:

$$(t_1 - \Delta t) \leq t_2 \leq t_1$$

where $\Delta t$, is the preselected time period, $t_1$ is the time at which the request (and/or location information) was received by the server, and $t_2$ is the time corresponding to the time information received from the requesting computer. Other suitable algorithms or like means may be used to determine whether or not $t_2$ is acceptable for a given user computer request. A step 40 for testing the acceptability of the time $t_2$, can improve the reliability that the location information was not pre-generated and recorded at another region. Thus, time testing step 40 can provide a greater confidence to the provider that the location information in a given request was generated by a positioning system at the same location (or at least within the same local region) as the requesting computer and at about the same time that the requesting computer is making the request.

In the FIG. 2 embodiment, the determination of whether or not the time information received from the requesting computer corresponds to an acceptable time (step 40) is carried out following the determination that the requesting computer is within a non-restricted region or, at least, a limited access region (step 34). However, in other embodiments, the acceptable time determination step (step 40) may be carried out before the region restriction determination step (step 34), such that the request is tested for an acceptable time prior to being tested for an acceptable geographic region. In such an embodiment, if the time $t_2$ is determined to be not acceptable, then access would be denied (step 36). The process would not proceed to the region-restriction determination step (step 34) unless the time $t_2$ is determined to be acceptable in the time determination step.

Time information (corresponding to time $t_2$) which is communicated to the server 12 by the requesting computer (14-16) is preferably derived or generated from information obtained from the satellite (or other) signals received by the positioning system (20-22) associated with the requesting computer. Typical modern GPS receivers receive and process time information signals as part of the satellite-signal processing steps carried out to determine geographic location. Because this time information will generally correspond to the time at which the satellite signals are received and processed by the requesting computer, this time information may be used to provide the time information communicated to the server 12 by the requesting computer (14-16). Alternatively, the time information may be obtained from other sources, including but not limited to a clock (not shown) located external or internal to the positioning system (20-22) and/or computer (14-16).

In further preferred embodiments, for purposes of minimizing counterfeit position or time information, the requesting computer (or more preferably, the positioning system) may be controlled to encode the time data and the geographic location data before transmission to the server 12. In yet further preferred embodiments, the location and time information provided by the positioning system (20-22) are encoded together to render it more difficult to determine either one or both items of information without the decryption algorithm or key. In yet further preferred embodiments, the location and time information may be encoded by the requesting computer (or more preferably, the associated positioning system) according to an asynchronous key encoding scheme, wherein a common encoding key K1 is used at the user computer side and a decoding key K2, different from the encoding key K1 issued to the user computers, is used by the server 12 for decoding the user computer's communication and obtaining the location and time information therefrom.

Figure 3A:
FIG. 3a is a block diagram representing a communication packet provided by a user computer of the system shown in FIG. 1, according to an embodiment of the present invention.
Figure 3B:
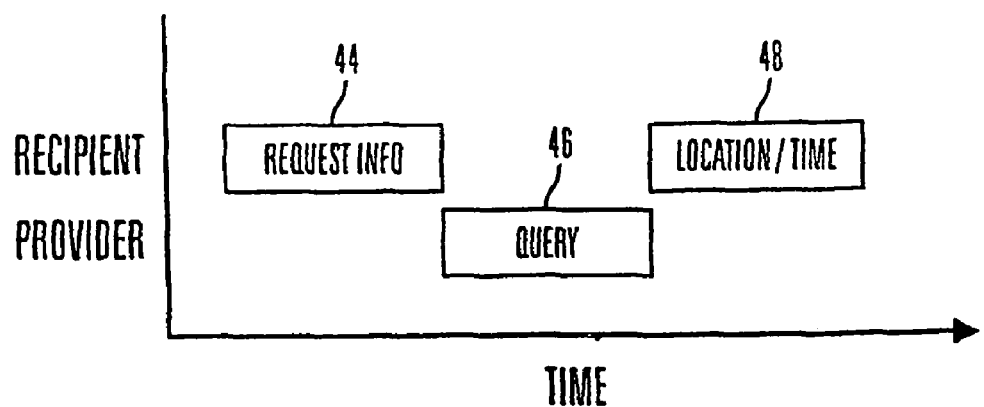
FIG. 3b is a block diagram representing communication packets provided by a user computer and the provider computer of the system shown in FIG. 1, according to a further embodiment of the present invention.

In this manner, a requesting computer communicates location information having (and preferably encoded with), in effect, a time stamp corresponding generally to the time at which the satellite signals were received and the location information was generated. In one embodiment, the location and time information may be communicated from the requesting computer as part of the request (as represented in FIG. 3a) or as part of a separate communication (as represented in FIG. 3b). More specifically, FIGS. 3a and 3b represent examples of alternative schemes for carrying out step 30 of FIG. 2. In FIG. 3a, a request packet 42 communicated by the requesting computer to the server 12 includes location and time information, as well as information identifying the product or service requested ("request info") and, optionally, information identifying the user ("user info"). Preferably, at least the location and time information is encoded. However, in further preferred embodiments, all of the information may be encoded together to render it more difficult to decode without the decoding key or algorithm.

In more preferred embodiments, the location and time information are communicated separate from the requested product information ("request info"), as shown in FIG. 3*b*. In FIG. 3*b*, the requesting computer first communicates a request for a product or service, as represented by request packet 44. The server 12 may then be controlled to determine whether or not the requested product or service is one which involves geographic restrictions or limitations. If not, the server may be operated to take further steps to provide access to the requested product or service. However, if the requested product or service is one which does involve geographic restrictions or limitations, then the server may be controlled to communicate a query 46 to the requesting computer, in response to which the requesting computer may then communicate location and time information (represented by packet 48).

In further preferred embodiments, the user computer 14-16 is controlled by software 26-28 to periodically (or otherwise successively) communicate location and/or time information generated by the associated positioning system 20-22 (preferably also periodically or otherwise successively, corresponding to the periodic or successive communications) during a communication interchange between the provider server 12 and the user computer. As a result, the provider server is provided with multiple location and/or time information packets over the course of a communication interchange, to continue to monitor the user computer's location (or region) and reported time, thus, to allow the provider server a greater confidence that the user computer is located at the location or region that corresponds to the location information during the time of the communication interchange. While, in the above embodiments, the user computers may be controlled to automatically communicate the periodic (or successive) location and/or time information, in a further embodiment, the server computer 12 may be controlled by software 29 to periodically (or otherwise successively) communicate queries to the user computer 14-16 during a communications interchange, requesting that the user communicate location and/or time information. The user computer may then be controlled by its associated software to respond to each query by communication location and/or time information to the provider server.

Figure 4:
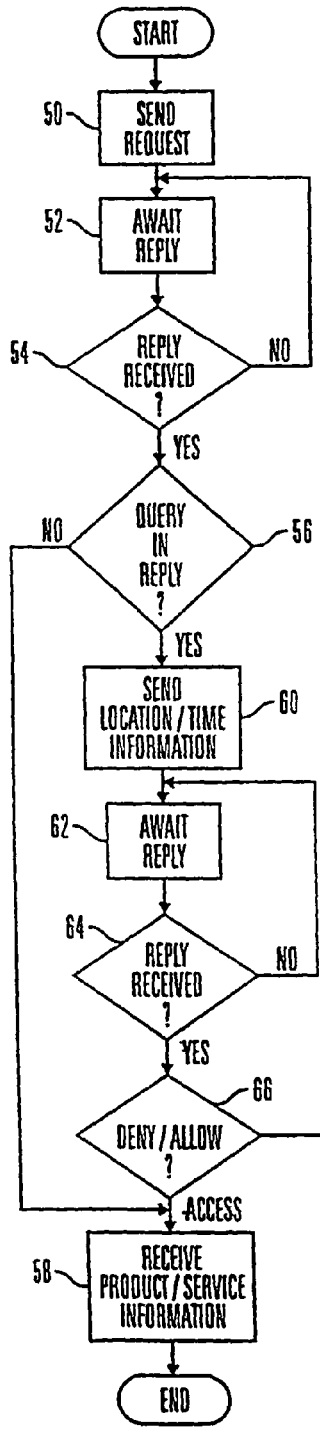
FIG. 4 is a flow chart representing an example embodiment of a process carried out by a user computer of the system shown in FIG. 1.
Figure 5:
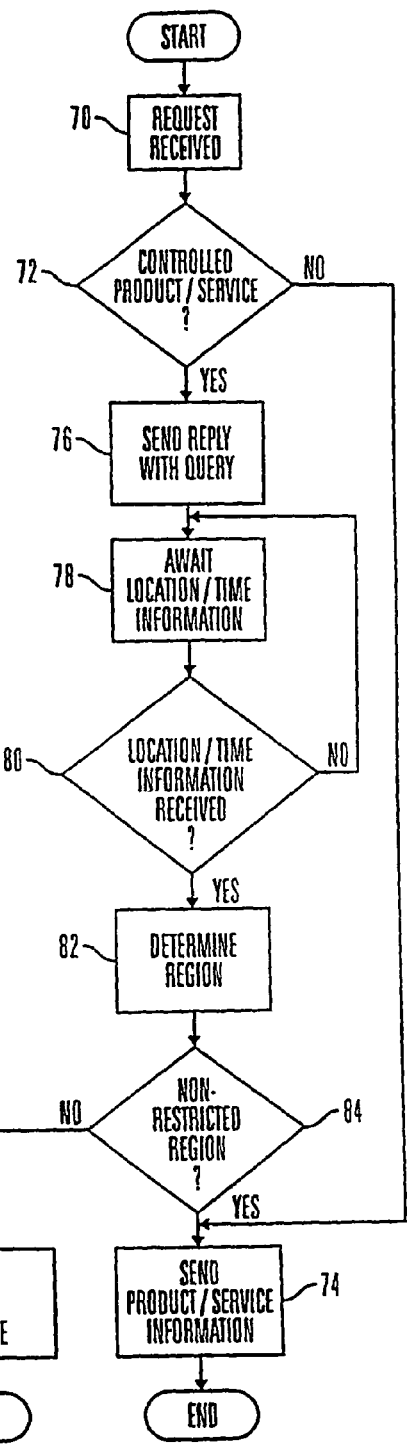
FIG. 5 is a flow chart representing an example embodiment of a process carried out by the provider computer of the system shown in FIG. 1.

The flow charts of FIGS. 4 and 5 show example processes carried out by the requesting computer (14-16) and the server 12, respectively, under the control of the software (26-28) and 29, respectively. The flow chart of FIG. 4 represents an example embodiment of a process carried out by the requesting computer, in accordance with the scheme of FIG. 3*b*.

Initially, the requesting computer communicates a request (step 50) and then awaits a reply (steps 52 and 54). Preferably, if a reply is not received within a predetermined time from the request step 50, a determination is made (in step 54) to terminate the process as a failed attempt. If a reply is received within the allotted time, then a determination is made as to whether or not the reply is a query for location information and/or time information (step 56). If not, the requesting computer prepares for receiving the requested product or service (step 58). However, if the reply is a query for location and/or time information, then the requesting computer is controlled to communicate location and/or time information (step 60) and awaits a reply (steps 62 and 64). Such location and/or time information may be encoded prior to communication, as part of step 60.

Preferably, if a reply is not received within a predetermined time from the send step 60, a determination is made (in step 64) to terminate the process as a failed attempt. If a reply is received within the allotted time, then a determination is made as to whether or not the reply is a denial message (step 66) and, if so, the user computer may be controlled to display a "denied access" message to the user and the procedure may be terminated. If, on the other hand, the reply is an acceptance message or the requested product or service, then the requesting computer prepares for receiving the requested product or service (step 58).

The flow chart in FIG. 5 represents an example embodiment of a process carried out by the server 12, upon receiving a request for a product or service. In the FIG. 5 embodiment, the server receives a request from a user computer (step 70). The server 12 is then controlled to determine whether or not the requested product or service is one which is limited or restricted geographically (step 72). This may be accomplished, for example, by comparing identification information for the requested product or service with a pre-stored (or on-line) table or list of products or services which have geographic limitations or restrictions (or which are free of such limitations or restrictions).

If the requested product or service is not limited or restricted by the geographic location of the requester, then from step 72, the process proceeds to prepare for sending the requested product or service (step 74). If, on the other hand, the requested product or service is one which is geographically limited or restricted, then the server 12 is controlled to send one or more queries, requesting location and/or time information (step 76) and then await receipt of such information (steps 78 and 80). Preferably, if a reply is not received within a predetermined time from the send step 76, a determination is made (in step 80) to terminate the process as a failed attempt. If a reply is received within the allotted time, then, at least in some embodiments, the region in which the user computer resides is determined (step 82) and the thus-determined region is compared with a table or list of non-restricted (or restricted or limited) regions (step 84) to determine whether the requesting computer is within a restricted, limited or non-restricted access region. Alternative embodiments may determine this information from the location information, instead of first determining the region to which the location information corresponds. If the location and/or time information was encoded prior to communication from the user computer, then step 82 would also involve a step of decoding the encoded information prior to determining the geographic region associated with the information.

If the server determines that the requesting computer is within a non-restricted region, then the server prepares to send the requested product or service (step 74). Otherwise, the server sends a deny message to the requesting computer 76 and terminates the process (step 86).

While, the processes represented in FIGS. 4 and 5 are example embodiments for carrying out various aspects of the present invention, other processes which involve the communication over the Internet (or other communications network) of location information obtained from positioning system (such as a GPS) and which limit or restrict access to products or services based on such location information, may be within the scope of further embodiments of the present invention.

Furthermore, it is noted that determinations, such as whether or not the user computer is in a restricted region or the degree of restriction or additional information needed based on the user's geographic location are primarily described above as being performed by the server 12. This may be preferred for purposes of minimizing fraudulent requests.

However, other embodiments may employ the user computer software (26-28) to perform some or all of these determinations. Thus, for example, the user computer (or information receiver processor) may operate with software that effectively locks the user computer (information receiver) out or otherwise disables or limits the user computer's ability to receive requested information, products or services, in the event that the user computer (information receiver) is in a geographic region for which access to such information, products or services is restricted or limited, or is not in a location that corresponds to a predefined (unrestricted) or expected geographic region. In such an embodiment, the user computer (information receiver) may be controlled by suitable software, firmware or the like residing on the user computer (or otherwise accessible by the user computer) to, for example, selectively allow or deny access to predefined information on the network, allow or deny receipt of information from the network, or enable or disable processing or receiving circuitry or routines necessary to receive or effectively use the predefined information on the network, without requiring the transmission of location information from the user computer (information receiver).

Systems or processes, as described above, in which the user computer or processor (rather than the provider processor) is controlled by software, firmware or the like for making determinations, such as whether or not the user computer is in a restricted region or the degree of restriction or additional information needed based on the user's geographic location, have a wide variety of useful applications for controlling access of information on the Internet or WWW. However, further embodiments employing such systems or processes have a wide variety of useful applications in connection with other communication systems. Consider, for example, satellite communications systems in which an information signal (such as, but not limited to, a television signal) is transmitted from a satellite to a plurality of receiver processors located in multiple geographic regions. According to one embodiment of the present invention, the transmitted information signal will be locked out from (unaccessible to) receiver processors that are in restricted geographic regions or that are not in an acceptable geographic region.

In one preferred embodiment, the information provider comprises a subscription satellite television signal provider and the recipient or receiver processors comprise satellite television receivers located at user (subscriber) locations. The positioning system (preferably a GPS), as well as the processor and software for performing steps as described above, are located with the user's (or subscriber's) satellite signal receiver or processing electronics. In this manner, the receipt and/or processing (such as, but not limited to, decrypting or decoding) of the television signal may be inhibited or restricted, unless GPS location data corresponds to predefined or expected location.

The provider may program or store the predefined or expected location in the receiver-side processor and associated memory, for example, when the provider issues the receiver equipment to the user (subscriber) or installs the receiver equipment at the user's (subscriber's) location. Alternatively, the provider may include information in the transmitted signal, representing the expected or predefined location of the receiver-side processor. Such predefined or expected location information (whether pre-programmed, pre-stored or received with the transmitted signal) is fed to the receiver-side processor. In addition, actual location information, such as GPS data from the GPS associated with the user (subscriber), is fed to the receiver-side processor, for example, when receiver is activated (or a particular television channel or program is selected by the user) to receive a content signal. If the actual location information matches the predefined or expected location, then access to the information (television signal) is allowed. Alternatively, or in addition, the content signal may be encoded according to an encoding scheme which can be decoded by a decoding scheme that requires proper GPS data as part of the decoding algorithm or as a decoding key or simply to allow access to the decoding algorithm or key.

Figure 6:
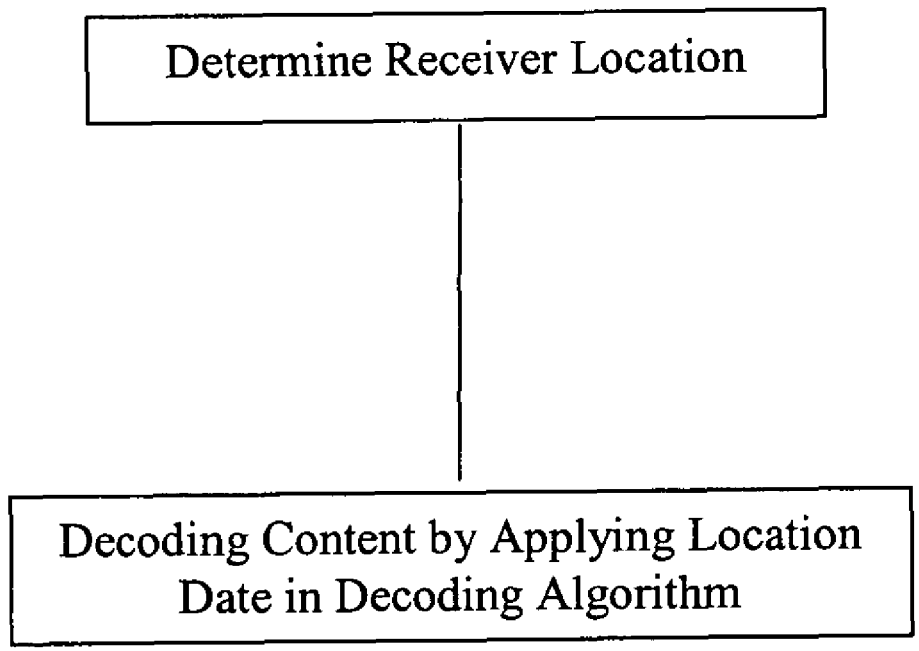
FIG. 6 is a flow chart representing an example embodiment of a further process carried out by a system as shown in FIG. 1.

FIG. 6 shows a flow chart of an example process as described above, wherein the geographic location of a receiver is determined (90) and an encrypted content signal is decrypted by applying location data as part of a decoding algorithm (92).

Also while some of the above embodiments are described as employing the software 26 to operate with the user computers, other embodiments may employ positioning systems 20-22 having processing means capable of processing the software 26-28 and performing the functions described above with respect to the computers 14-16, such that some or all of the location, time and request generation functions are performed by the systems 20-22. In such embodiments, the provider may issue (lend, lease or sell) and periodically (or otherwise successively) monitor such processing systems to customers (users) and may, thereby better guard against fraudulent use of the equipment.

While embodiments described above are primarily concerned with employing user (or recipient) location information to control access to information, other embodiments may employ provider location information to control access to information in a similar manner. In such embodiments, the provider processor is associated with a positioning system (such as a GPS) for providing location information representing the geographic location of the provider. Such information is transmitted over the communications network to the recipient processor(s), for example during a handshaking exchange or in conjunction with the transmission of content information. The recipient processor would, then be controlled, for example, according to processes described above, to determine whether the provider processor location information corresponds to an expected (or predefined or pre-stored) location. If not, then the recipient processor may ignore or deny user access to the information. If the provider processor location information does correspond to an expected location, then the recipient process would be controlled to allow processing and/or user access to further information received from the provider. In this manner, provider authentication may be accomplished, using the provider location information (such as GPS data) to verify the authenticity of the provider information.

Also, while a number of determinations are described above as being accomplished by comparing a value (product identification, location information, region information, user computer id, user location) to a table or list of such values, other embodiments may employ suitable algorithm-based schemes for rendering the determinations.

Further embodiments may employ additional features, such as means for the provider computer to compare the location information received from the requesting computer with other location information obtained from the user, such as, but not limited to, billing address information associated with credit card numbers provided by the user, pre-stored address information (for example, stored in storage means 13 or available to the server from other on-line sources, not shown) which is expected to correspond to a particular user, or the like. If the location information does not correspond to the address information, access to the requested product or service may be denied or limited.

Other uses of location information transmitted by a user computer over the Internet may include, for example, uses associated with detecting stolen or contraband computers. For example, user computers which operate with satellite-signal positioning systems as described above may be programmed to transmit location information to a predetermined address when connected to the Internet such that, in the event the computer is stolen, the computer's location may be tracked. The location information may also be used to track the location of illegal subscribers of Internet connection services.

The embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

What is claimed is:

1. A method for communicating text or image information between a plurality of first computers and a second computer coupled to a communications network dependent on geographic locations of the first computers, the method comprising:
   receiving, at the second computer, a request from a first one of the first computers for particular text or image information provided over the communications network;
   receiving location information corresponding to a geographic location of said first one of the first computers;
   receiving, at the second computer, a request from a second one of the first computers for the particular text or image information provided over the communications network;
   receiving location information corresponding to a geographic location of said second one of the first computers;
   determining, from the location information, whether or not the geographic location of said first one of the first computers is within one or more predefined regions;
   determining, from the location information, whether or not the geographic location of said second one of the first computers is within the one or more predefined regions; and
   providing said first one of the first computers access to a first text or image information over the communications network in response to the request from said first one of the first computers for the particular text or image information, upon the geographic location of said first one of the first computers being determined to be within a predefined region; and
   providing said second one of the first computers access to a second text or image information in response to the request from said second one of the first computers for the particular text or image information, upon the geographic location of said second one of the first computers not determined to be within one of the predefined regions, wherein the second text or image information is different from the first text or image information;
   wherein one of the first and second text or image information is a partial version of the other one of the first and second text or image information; and
   wherein the partial version of the one of the first and second text or image information is unrelated to the relative distance between the geographic locations of said first and second ones of the first computers.

2. A method as recited in claim 1, wherein said communications network comprises the Internet.

3. A method as recited in claim 1, wherein said receiving location information comprises receiving location information from a satellite signal receiving and processing system associated with the first computer.

4. A method as recited in claim 1, wherein said first text or image information comprises part of but not the entire second text or image information.

5. A method as recited in claim 1, wherein, upon the geographic location of said first one of the first computers not determined to be within a predefined region, the method further comprises communicating to said first one of the first computers a warning message or a denial message.

6. A method as recited in claim 1, wherein, upon the geographic location of said first one of the first computers not determined to be within a predefined region, the method further comprises communicating to said first one of the first computers a request for further information.

7. A method as recited in claim 1, wherein, after and upon the geographic location of said first one of the first computers being determined to be within a predefined region, the method further comprises:
   communicating to said first one of the first computers a request for further information; and
   providing said first one of the first computers with access to the first text or image information in the event that the further information is received from said first one of the computers and denying said first one of the first computers access to the requested text or image information in the event that the further information is not received from said first one of the first computers.

8. A method as recited in claim 7, wherein said further information comprises payment information.

9. A method as recited in claim 1, wherein the second text or image information comprises a part of but not the entire first text or image information.

10. A method as recited in claim 1, wherein providing access to a first text or image information over the communications network and providing access to a second text or image information over the communications network comprises communicating the first and second text or image information from the second computer.

11. A method for communicating text or image information between first and second computers coupled to a communications network dependent on geographic location of the first computer, the method comprising:
   receiving, at the second computer, a request from the first computer for particular text or image information provided over the communications network;
   receiving location information corresponding to a geographic location of the first computer;
   determining, from the location information, whether or not the geographic location of the first computer is within one or more predefined regions; and
   providing access to a first text or image information over the communications network in response to the request for the particular text or image information in the event that the geographic location of the first computer is determined to be within a predefined region, and providing access to a second text or image information in response to the request for the particular text or image information in the event that the geographic location of the first computer is not determined to be within a predefined region, wherein the second text or image information is different from the first text or image information;

wherein, in the event that the geographic location of the first computer is not determined to be within a predefined region, the method further comprises providing access to the second text or image information to the first computer only in the event that an acceptance of an agreement is received from the first computer, wherein, in the event that the geographic location of the first computer is determined to be within a predefined region, the method further comprises providing access to the first text or image information whether or not an acceptance of an agreement is received; and one of the first and second text or image information is a partial version of the other one of the first and second text or image information.

12. A method as recited in claim 11, wherein the first text or image information is a partial version of the second text or image information.

* * * * *